(12) United States Patent
Nagai et al.

(10) Patent No.: US 6,679,079 B2
(45) Date of Patent: Jan. 20, 2004

(54) VEHICLE AIR-CONDITIONING SYSTEM

(75) Inventors: Keisuke Nagai, Toyota (JP); Yoshiaki Takano, Kosai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/242,140

(22) Filed: Sep. 10, 2002

(65) Prior Publication Data

US 2003/0046946 A1 Mar. 13, 2003

(30) Foreign Application Priority Data

Sep. 10, 2001 (JP) ........................................ 2001-273058

(51) Int. Cl.⁷ .................................................. B60H 1/32
(52) U.S. Cl. ........................................... 62/244; 165/42
(58) Field of Search ........................... 62/244; 237/2 B; 165/42, 43

(56) References Cited

U.S. PATENT DOCUMENTS

| 5,291,941 | A | | 3/1994 | Enomoto et al. | |
|---|---|---|---|---|---|
| 5,299,631 | A | * | 4/1994 | Dauvergne | 165/204 |
| 6,016,967 | A | * | 1/2000 | Takechi et al. | 237/12.3 R |
| 6,148,632 | A | * | 11/2000 | Kishita et al. | 62/323.1 |
| 6,237,681 | B1 | * | 5/2001 | Takano et al. | 165/241 |
| 6,371,202 | B1 | * | 4/2002 | Takano et al. | 165/202 |
| 6,397,613 | B1 | * | 6/2002 | Izawa et al. | 62/196.4 |

FOREIGN PATENT DOCUMENTS

| EP | 0 894 651 A2 | * | 3/1999 | ............ B60H/1/00 |
|---|---|---|---|---|
| JP | 61-76242 | | 5/1986 | |
| JP | 7-52636 | | 2/1995 | |
| JP | 8-258533 | | 10/1996 | |
| JP | 411042934 A | * | 2/1999 | ............ B60H/1/22 |
| JP | 11235919 A | * | 8/1999 | |
| JP | 3314692 B2 | * | 8/2002 | |

* cited by examiner

*Primary Examiner*—William C. Doerrler
*Assistant Examiner*—Mohammad M. Ali
(74) *Attorney, Agent, or Firm*—Harness, Dickey & Pierce, PLC

(57) ABSTRACT

An air conditioning system for a vehicle has a plurality of heat enhancing means including at least a hot gas heater cycle for heating air blown into a passenger compartment by directly introducing a discharged gas refrigerant from a compressor into an interior heat exchanger. Additionally, an electric heater is provided as another passenger compartment heating enhancing means. When heat requirements are high (outside air temperature is low), both the hot gas heater cycle and the electric heater are activated, and when the heat requirements decrease, the hot gas heater cycle is deactivated first, and then the electric heater is deactivated. Therefore, the adverse effects of a vehicle compartment temperature that the driver is sensing can be avoided. Additionally, controlling vehicle window fogging associated with an operation of the hot gas heater cycle is possible.

17 Claims, 3 Drawing Sheets

VEHICLE AIR-CONDITIONING SYSTEM

CROSS REFERENCE TO RELATED APPLICATION

This application is based upon, claims the benefit of priority of, and incorporates by reference the contents of prior Japanese Patent Application No. 2001-273058 filed Sep. 10, 2001.

BACKGROUND OF THE INVENTION

1. Field of the Invention

The present invention relates to an air conditioning system for a vehicle capable of performing a hot gas heating function that uses an interior heat exchanger (evaporator) as a radiator for a gas refrigerant by directly introducing a compressor discharged gas refrigerant (hot gas) into the interior heat exchanger during heating.

2. Description of the Related Art

Conventionally, an air conditioning system for a vehicle circulates hot water (engine cooling water) through a heat exchanger during heating in the wintertime, and heats air conditioning air in the heat exchanger by using the hot water as a heat source. In this case, however, when the temperature of the hot water is low, so is the temperature of the air blown into the passenger compartment, and the air conditioning system may fail in attaining the required heating capacity.

In order to solve this inconvenience, Japanese Patent Laid-Open Publication No. Hei. 5-223357 proposes a refrigerating cycle apparatus capable of performing a heating function by using a hot gas heater cycle. According to this conventional apparatus, when a temperature of the hot water is lower than a predetermined temperature such as during the starting of an engine, the hot gas heater cycle for introducing a compressor discharged gas refrigerant (hot gas) into an evaporator by bypassing a condenser is formed, so that the air conditioning system becomes able to perform a heating function by allowing the gas refrigerant to radiate heat into air conditioning air in the evaporator. In other words, the conventional apparatus uses the evaporator, which is a single interior heat exchanger installed inside the air conditioning case, by switching to serve as a cooler during the cooling mode and as a radiator during the heating mode.

Incidentally, when the outside air temperature is −10° C. or below, even when the heating function is performed by the hot gas heater cycle, the air conditioning system may still fail in achieving the required heating ability. In view of the foregoing, the inventors of the present invention conducted a study of a combination of the hot gas heater cycle and another auxiliary heating means, such as an electric heater.

SUMMARY OF THE INVENTION

It is therefore an object of the present invention to provide an air conditioning system for a vehicle provided with a plurality of heat enhancing means including at least a hot gas heater cycle, in which operations of the plurality of heat enhancing means are controlled in a satisfactory manner without adversely influencing a temperature the driver senses.

Also, because the hot gas heater cycle uses a single interior heat exchanger installed inside the air conditioning case that alternates to serve as a cooler during the cooling mode and as a radiator during the heating mode, condensed water formed due to a cooling and dehumidification action during the cooling mode evaporates during the heating mode, which causes unwanted fogging on the windshield and side and rear windows (hereinafter, referred to collectively as the windows) of a vehicle. It is therefore another object of the present invention to control the occurrence of fogging on the windows of a vehicle associated with an operation of the hot gas heater cycle.

In order to achieve the above and other objects, a first aspect of the present invention provides an air conditioning system for a vehicle including: a hot gas heater cycle for heating air blown into a passenger compartment by directly introducing a discharged gas refrigerant from a compressor in a refrigerating cycle into an interior heat exchanger; and a plurality of heat enhancing means including the hot gas heater cycle as a heat enhancing means for enhancing a passenger compartment heating ability, wherein, when a heating load is large, the plurality of heat enhancing means are activated, and when the heating load is decreased to or below a predetermined value, one of the plurality of heat enhancing means is deactivated.

According to a first aspect of the invention, a temperature of air blown into the passenger compartment is raised by activating the plurality of heat enhancing means including the hot gas heater cycle when the outside air temperature is extremely low and the heating load is large, which makes it possible to enhance the passenger compartment heating ability in an extremely cold region. Moreover, not all of the plurality of heat enhancing means are activated and deactivated simultaneously, and the number of activated heat enhancing means out of the plurality of heat enhancing means is changed in response to a change in the heating load. This makes it possible to control a change in temperature of the air blown into the passenger compartment when the operations of the heat enhancing means are switched. Consequently, it is possible to reduce a change in temperature the driver may feel when the operations of the plurality of heat enhancing means are switched.

A second aspect of the invention provides an air conditioning system for a vehicle according to the first aspect, wherein the hot gas heater cycle is deactivated when the heating load is decreased to or below the predetermined value. According to the second aspect, the hot gas heater cycle is activated only in extremely cold regions where the heating load is large, and the hot gas heater cycle is deactivated when the heating load is decreased to or below the predetermined value. Consequently, it is possible to control the occurrence of fogging on the windows of a vehicle associated with an operation of the hot gas heater cycle.

To be more specific, in a region where the heating load is small, a temperature of the interior heat exchanger rises higher by the operation of the hot gas heater cycle as the heating load becomes smaller. Hence, when condensed water adheres onto the surface of the interior heat exchanger, the condensed water readily evaporates, which causes unwanted fogging on the windows of a vehicle. However, according to the second aspect of the invention, the hot gas heater cycle is deactivated in the region where the heating load is small and therefore the condensed water readily evaporates. Hence, it is possible to control the occurrence of fogging on the windows of a vehicle by controlling evaporation of the condensed water from the interior heat exchanger.

A third aspect of the invention provides an air conditioning system for a vehicle, including: a hot gas heater cycle for heating air blown into a passenger compartment by directly introducing a discharged gas refrigerant from a compressor in a refrigerating cycle into an interior heat exchanger; and a plurality of heat enhancing means including the hot gas heater cycle as heat enhancing means for enhancing a passenger compartment heating ability. The operations of the plurality of heat enhancing means are controlled in response to a change in a heating load and when the plurality of heat enhancing means are deactivated due to a decrease of the heating load, the hot gas heater cycle is deactivated, after which the heat enhancing means, other than the hot gas heater cycle, are then deactivated.

According to the third aspect, the hot gas heater cycle is deactivated in a region where the heating load is small and therefore condensed water readily evaporates. Consequently, as with the second aspect, it is possible to control the occurrence of fogging on the windows of a vehicle. Also, the operational advantage attained in the first aspect can be provided as well.

A fourth aspect of the invention provides an air conditioning system for a vehicle, including a hot gas heater cycle for heating air blown into a passenger compartment by directly introducing a discharged gas refrigerant from a compressor in a refrigerating cycle into an interior heat exchanger and a plurality of heat enhancing means including the hot gas heater cycle as heat enhancing means for enhancing a passenger compartment heating ability. Operations of the plurality of heat enhancing means are controlled in response to a change in a heating load and when the plurality of heat enhancing means are deactivated due to a decrease of the heating load, the hot gas heater cycle is deactivated first.

According to the fourth aspect, when the heating load is decreased, the hot gas heater cycle is deactivated first, and then the heat enhancing means other than the hot gas heater cycle is deactivated. Consequently, the same operational advantage as in the third aspect can be provided.

A fifth aspect of the invention provides an air conditioning system for a vehicle according to any one of the first through fourth aspects, which is arranged in such a manner that an electric heater is included as the heat enhancing means other than the hot gas heater cycle. This makes it possible to readily enhance the passenger compartment heating ability with the electric heater.

A sixth aspect of the invention provides an air conditioning system for a vehicle according to any one of the first through fifth aspects, which is arranged in such a manner that the heating load can be judged based on at least one of an outside air temperature, an inside air temperature, and a blowing air temperature of the interior heat exchanger.

A seventh aspect of the invention provides an air conditioning system for a vehicle according to any one of the first through sixth aspects, but further including a hot-water heat exchanger for heating the air blown into the passenger compartment using hot water as a heat source. The plurality of heat enhancing means forms auxiliary heating means with respect to the hot-water heat exchanger.

According to the seventh aspect, when the heating load is large, a main heating operation by the hot-water heat exchanger is combined with an auxiliary heating operation by the plurality of heat enhancing means, which makes it possible to quickly begin passenger compartment heating.

An eighth aspect of the invention provides an air conditioning system for a vehicle according to the seventh aspect, wherein a temperature of the hot water circulating through the hot-water heat exchanger is detected, and operations of the plurality of heat enhancing means are controlled depending on the temperature of the hot water. According to the eighth aspect, it is possible to activate the plurality of heat enhancing means only when the main heating ability of the hot-water heat exchanger is insufficient.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
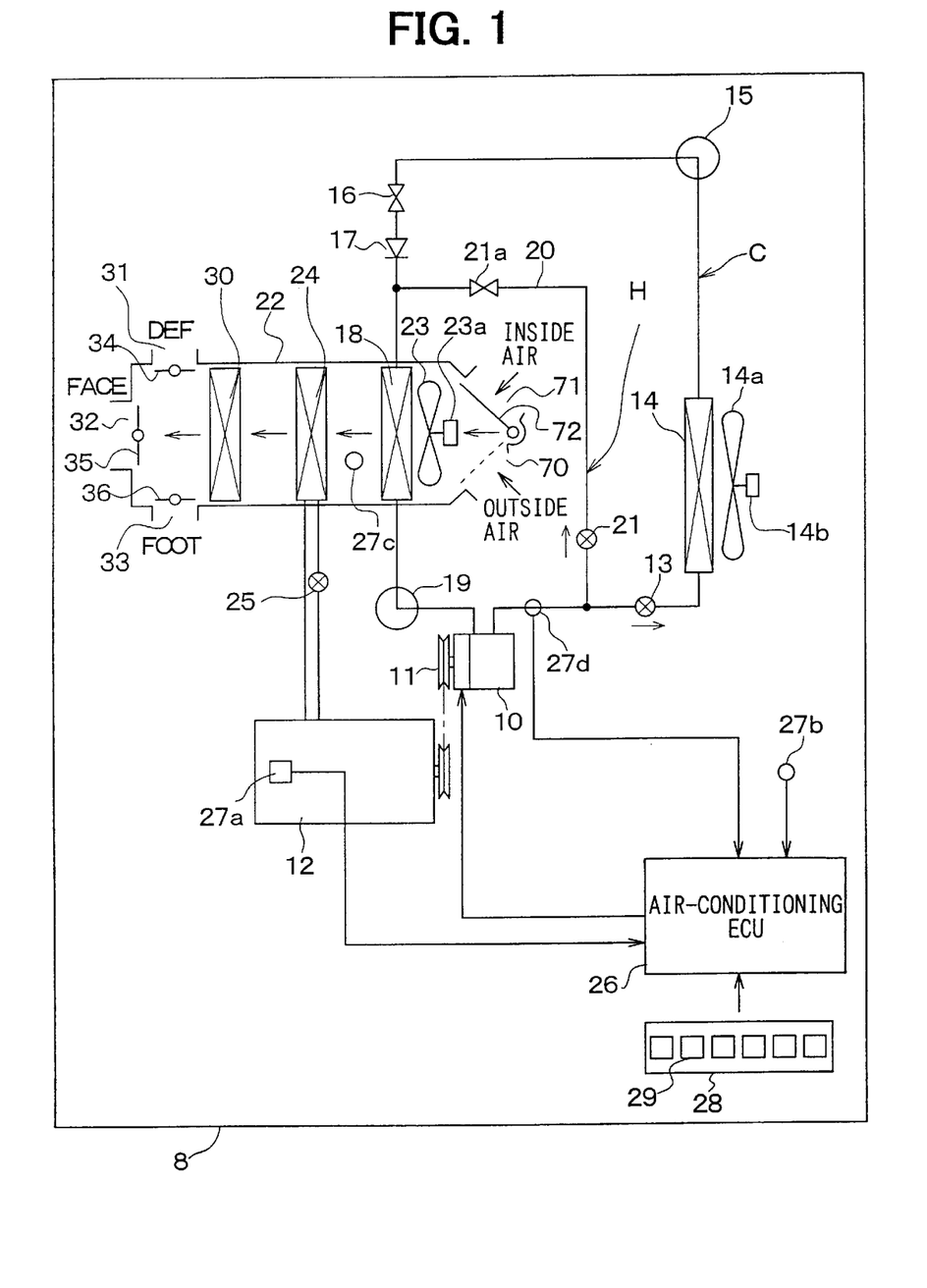
FIG. 1 is a schematic view showing an overall arrangement according to an embodiment of the present invention.

FIG. 1 is a view showing, by way of example, an overall arrangement of an air conditioning system for a vehicle 8 according to one embodiment of the present invention. A compressor 10 is driven by a water cooled vehicle engine 12 via an electromagnetic clutch 11, and for example, is composed of a swash plate type compressor of a fixed displacement type.

A discharge side of the compressor 10 is connected to a condenser 14 via a cooling electromagnetic valve 13, and an outlet side of the condenser 14 is connected to a liquid receiver 15 in which a refrigerant is separated into a gas phase and a liquid phase so that the resulting liquid refrigerant can be stored. The condenser 14 together with the compressor 10, and the like, is installed in the vehicle engine compartment, and serves as an exterior heat exchanger for exchanging heat with outside air (cooling air) sent from an electric cooling fan 14a with a driving motor 14b.

An outlet side of the liquid receiver 15 is connected to a thermostatic expansion valve 16 serving as a cooling pressure-reducing apparatus. An outlet side of the thermostatic expansion valve 16 is connected to an evaporator 18 via a check valve 17. An outlet side of the evaporator 18 is connected to an intake side of the compressor 10 via an accumulator 19.

A normal cooling refrigerating cycle C is composed of a closed circuit starting from the discharge side of the compressor 10 and returning to the intake side of the compressor 10 through the cooling electromagnetic valve 13→condenser 14→liquid receiver 15→thermostatic expansion valve 16→check valve 17→evaporator 18→accumulator 19.

As is known, the thermostatic expansion valve 16 adjusts a valve opening degree (a flow quantity of refrigerant) to maintain a degree of overheat of the outlet refrigerant in the evaporator 18 at a predetermined value during the normal operation of the refrigerating cycle (during the cooling mode). The accumulator 19 separates the refrigerant into a gas phase and a liquid phase and stores the resulting liquid refrigerant while allowing the gas refrigerant and a small quantity of the liquid refrigerant (with oil being melt in it) at or near the bottom to be taken into the compressor 10 side.

On the other hand, a hot gas bypassing channel 20 for bypassing the condenser 14 and the like is provided between the discharge side of the compressor 10 and the inlet side of the evaporator 18, and a heating electromagnetic valve 21 and a throttle 21a are provided in series in the bypassing channel 20. The throttle 21a serves as a heating pressure-reducing device, and can be composed of a stationary throttle, such as an orifice and a capillary tube. A heating hot gas heater cycle H is composed of a closed circuit starting from the discharge side of the compressor 10 and returning to the intake side of the compressor 10 through the heating electromagnetic valve 21→throttle 21a→evaporator 18→accumulator 19.

The air conditioning case 22 of the air conditioning system for a vehicle defines an air channel through which air flows into the passenger compartment, and air is blown inside the air conditioning case 22 by an electronic air conditioning blower 23. The air conditioning blower 23 is indicated as an axial blower in the drawing for ease of illustration; however, the air conditioning blower 23 in practice is a centrifugal blower equipped with a centrifugal fan, and is driven to rotate by a blower motor 23a controlled by a blower driving circuit. Other types of blowers may also be used. A quantity of air blown by the blower 23 of the present embodiment can be changed continuously or step by step by adjusting a blower control voltage applied to the blower motor 23a.

Also, an outside air intake port 70 for taking in outside air of the passenger compartment (hereinafter, referred to as the outside air), an inside air intake port 71 for taking in inside air of the passenger compartment (hereinafter, referred to as the inside air), and an inside/outside air switching door 72 are provided at the intake side of the air conditioning blower 23. Although it is not shown in the drawing, the inside/outside air switching door 72 is driven by an actuator, such as a servo motor, via linking mechanism, and forms inside/outside air switching means for switching at least between an outside air mode for taking in outside air through the outside air intake port 70 and an inside air mode for taking in inside air through the inside air intake port 71.

The evaporator 18 is an interior heat exchanger installed inside the air conditioning case 22, and a refrigerant is circulated through the same by the cooling refrigerating cycle C during the cooling mode, whereby air being blown by the air conditioning blower 23 is cooled by refrigerant evaporation (endothermic reaction) in the evaporator 18. Also, during the heating mode, the evaporator 18 heats air with a high-temperature refrigerant gas (hot gas) that flows via the hot gas bypassing channel 20, thereby serving as a radiator.

A hot water heat exchanger 24 for heating air being blown by using hot water (engine cooling water) from the vehicle engine 12 as a heat source is provided at the downstream side of air in the evaporator 18 inside the air conditioning case 22. A hot water valve 25 for controlling a flow of the hot water is provided to a hot water circuit connected to the heat exchanger 24.

Also, an electric heater 30 is provided at the downstream side of air in the hot water heat exchanger 24 inside the air conditioning case 22. The electric heater 30 is made such that it has an air passing channel, through which passes air being blown inside the air conditioning case 22, such as a honeycomb shape, so that the entire quantity of air being blown inside the air conditioning case 22 can be heated.

Incidentally, the hot-water heat exchanger 24 serves as a main heating means for heating inside the passenger compartment whereas the heating means composed of the hot gas heater cycle H and the heating means composed of the electric heater 30 are auxiliary heating means that form heat enhancing means of the present invention.

On the other hand, a defroster (DEF) outlet 31 for blowing out air conditioning air (mainly hot air) toward the inner surface of the windshield of a vehicle, a face (FACE) outlet 32 for blowing out air conditioned air (mainly cold air) toward the face (upper body) of the driver of a vehicle, a foot (FOOT) outlet 33 for blowing out air conditioned air (mainly hot air) toward the feet (lower body) of the driver of a vehicle, and a plurality of rotatable mode switching doors 34 through 36 for selectively opening and closing these outlets are provided at the extreme downstream position of blown air in the air conditioning case 22. The mode switching doors 34 through 36 form the blow-out mode switching means. Although it is not shown in FIG. 1, these doors are driven by an actuator, such as a servo motor, via a linking mechanism.

An air conditioning electronic control unit (hereinafter, referred to as the ECU) 26 is composed of a microcomputer and its peripheral circuits, and controls opening and closing operations of the electromagnetic valves 13 and 21 and operations of the other electrical components (11, 14a, 23, 25, 30, etc.) by performing predetermined computational processing according to a pre-set program.

Figure 2:
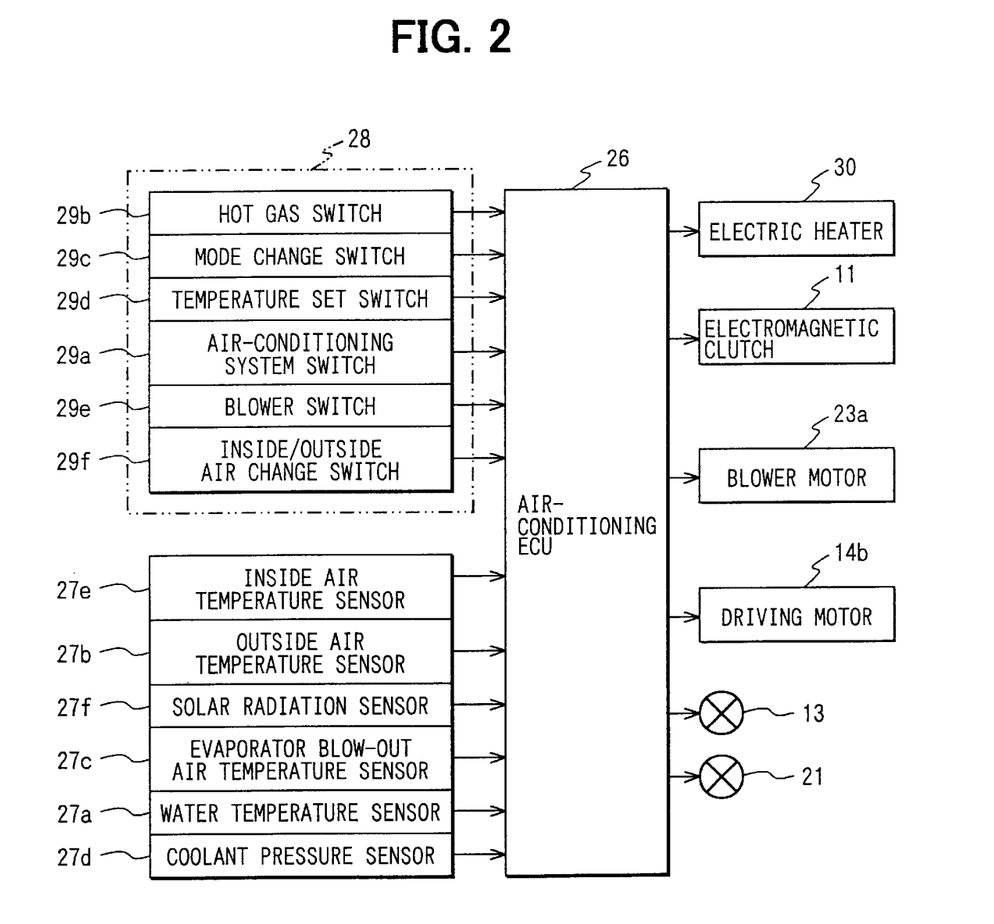
FIG. 2 is a block diagram detailing electrical control according to an embodiment of the present invention.

FIG. 2 is a block diagram showing electric control of the present embodiment. The ECU 26 receives detection signals from a sensor group including a water temperature sensor 27a of the vehicle engine 12, an outside air temperature sensor 27b, an evaporator blow-out air temperature sensor 27c serving as a temperature detecting means of the evaporator 18, a coolant pressure sensor 27d for detecting a discharged compressor pressure, an inside air temperature sensor 27e, and a solar radiation sensor 27f for detecting a quantity of solar radiation in the passenger compartment, etc.

Additionally, the ECU 26 receives manipulation signals from a manipulation switch group 29 having switches 29a–29f in an air conditioning manipulation panel 28 installed near the dashboard panel inside the passenger compartment. The manipulation switch group 29a–29f includes numerous switches. An air conditioning system switch 29a directs activation or deactivation of the compressor 10 in the refrigerating cycle, and serves as a cooler switch for setting the cooling mode. A hot gas switch 29b sets the heating mode by the hot gas heater cycle H, and serves as a heater switch.

Further, the air conditioning manipulation panel 28 is provided with a blower mode change switch 29c for switching the air conditioning blower modes, a temperature set switch (temperature setting means) 29d for setting a temperature inside the passenger compartment at a desired temperature, a blower switch 29e for controlling an ON and OFF operation of the blower 23 and a change in quantity of air being blown therefrom, an inside and outside air change switch 29f for directing a switching between the outside air mode and the inside air mode, etc.

Next, the following description will describe an operation according to the present embodiment arranged as above. Initially, an explanation will be given to an operation of the refrigerating cycle portion. During the cooling mode, the ECU 26 opens the cooling electromagnetic valve 13 and closes the heating electromagnetic valve 21. Hence, the electromagnetic clutch 11 is switched ON and the vehicle engine 12 starts to drive the compressor 10, whereby a discharged gas refrigerant from the compressor 10 passes through the opened cooling electromagnetic valve 13 and flows into the condenser 14.

The refrigerant is cooled to condense in the condenser 14 by outside air sent from the cooling fan 14a. Then, the refrigerant having passed through the condenser 14 is separated into a gas phase and a liquid phase in the liquid receiver 15. Subsequently, only the liquid refrigerant is depressurized by the thermostatic expansion valve 16 and brought into a gas-liquid dual phase state at a low temperature and a low pressure.

Then, the low-pressure refrigerant passes through the check valve 17, flows into the evaporator 18, and evaporates by undergoing an endothermic reaction with air conditioning air being blown by the blower 23. The air conditioning air cooled in the evaporator 18 is blown into the passenger compartment and cools the passenger compartment interior. The gas refrigerant evaporated in the evaporator 18 is taken into the compressor 10 via the accumulator 19 and compressed.

During the heating mode in wintertime, the ECU 26 closes the cooling electromagnetic valve 13 and opens the heating electromagnetic valve 21, whereby the hot gas bypassing channel 20 is opened. Accordingly, a high-temperature discharged gas refrigerant (overheated gas refrigerant) from the compressor 10 passes through the opened heating electromagnetic valve 21, then is depressurized by the throttle 21a, and flows into the evaporator 18.

At this point, the check valve 17 prevents the gas refrigerant via the hot gas bypassing channel 20 from flowing into the thermostatic expansion valve 16 side. Hence, the refrigerating cycle is operated by the closed circuit (hot gas heater cycle H) starting from the discharge side of the compressor 10 and returning to the intake side of the compressor 10 through the heating electromagnetic valve 21→throttle 21a→evaporator 18→accumulator 19.

Then, the overheated gas refrigerant depressurized by the throttle 21a radiates heat into air being blown in the evaporator 18, thereby heating the air being blown. Herein, a quantity of heat released from the gas refrigerant in the evaporator 18 is equivalent to a compressing work volume of the compressor 10. Having radiated heat in the evaporator 18, the gas refrigerant is taken into the compressor 10 via the accumulator 19 and compressed.

Hence, by flowing hot water through the hot water heat exchanger 24 via the hot water valve 25, the heat exchanger 24 is able to further heat the air being blown that has been heated in the evaporator 18. When the electric heater 30 is switched ON, the electric heater 30 is able to still further heat hot air having passed the heat exchanger 24, which makes it possible to blow out hot air at a higher temperature into the passenger compartment. The air conditioning blower 23 may be controlled during a warm-up period by operating using a small quantity of air when the hot water temperature in the engine 12 is low or below a particular temperature.

Figure 3:
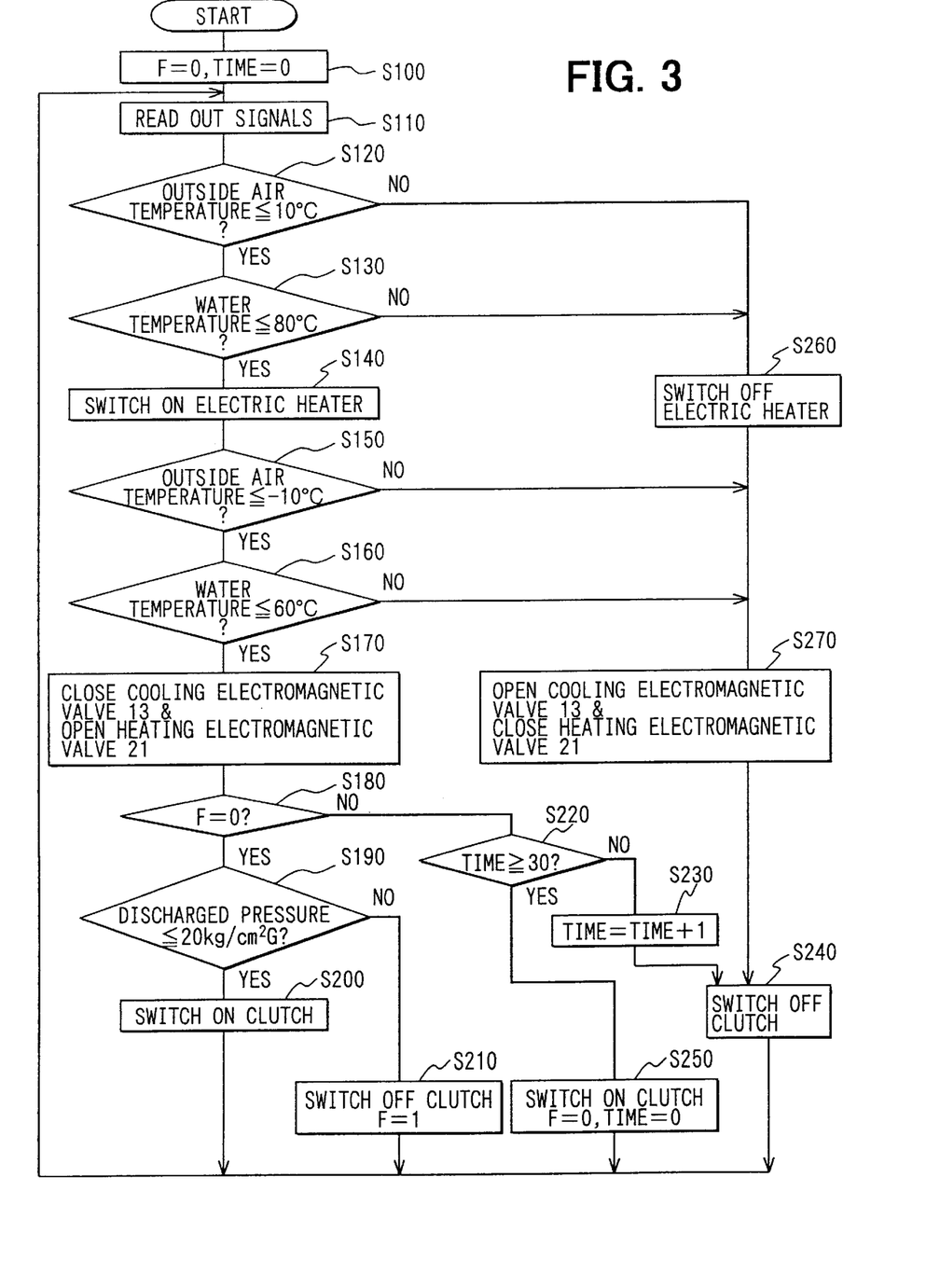
FIG. 3 is a flowchart detailing an operation according to an embodiment of the present invention.

Next, the following description will describe, with reference to FIG. 3, a control example on a concrete operation of the hot gas heater cycle H and the electric heater 30 during wintertime heating according to the present embodiment. A control routine of FIG. 3 begins, for example, when the ignition switch (not shown) of the vehicle engine 12 is turned ON and the hot gas switch 29b in the manipulation switch group 29 at the air conditioning system side is turned ON, whereupon initialization is performed in Step S100 by setting a flag F=0, a timer count=0, etc. Then, in Step S110, signals are read out from the respective sensors 27a through 27f and the respective manipulation switches 29a through 29f in the air conditioning manipulation panel 28.

Then, in Step S120, whether the outside air temperature is at or below a first predetermined value (for example, 10° C.) is determined. The first predetermined value is a threshold for determining a low outside air temperature region that needs auxiliary heating by the electric heater 30. 10° C. is used in the present example. When the outside air temperature is at or below the first predetermined value, the flow proceeds to Step S130, in which whether the engine water temperature is at or below a first predetermined value (for example, 80° C.) is determined.

When the engine water temperature is at or below the first predetermined value, the flow proceeds to Step S140, in which the electric heater 30 is switched ON, whereby air blown into the passenger compartment is heated (heater ON-state) by the electric heater 30. Then, in Step S150, whether the outside air temperature is at or below a second predetermined value (for example, −10° C.), lower than the first predetermined value, is judged. The second predetermined value is a threshold for judging an extremely cold region that needs an operation of the hot gas heater cycle H, and −10° C. is given in the present example.

When the outside air temperature is at or below the second predetermined value, the flow proceeds to Step S160, in which whether the engine water temperature is at or below a second predetermined value (for example, 60° C.), lower than the first predetermined value, is judged. When the engine water temperature is at or below the second predetermined value, the flow proceeds to Step S170, in which the heating mode using the hot gas heater cycle H is set by closing the cooling electromagnetic valve 13 and opening the heating electromagnetic valve 21.

To be more specific, when the outside air temperature is in the extremely cold region at or below the second predetermined value (for example, −10° C.) and the engine water temperature is at or below the second predetermined value (for example, 60° C.), the electric heater 30 is switched ON as soon as the hot gas heater cycle H is activated. This makes it possible to heat outside air at an extremely low temperature of −10° C. or below in the evaporator 18 with a hot gas first, and then heat the air being blown with the hot water heat exchanger 24 and the electric heater 30. Hence, both the hot gas heater cycle H and the electric heater 30 perform an auxiliary heating operation with respect to the hot water heat exchanger 24 performing a main heating operation, and raise the temperature of air blown into the passenger compartment. This makes it possible to enhance the passenger compartment heating ability in an extremely cold location.

Then, in Step S180, the flag F=0 is judged. If this judgment is an initial (first) judgment after the hot gas switch 29b is turned ON, naturally the flag F=0 is judged and the flow proceeds to Step S190. At step S190 whether a discharged pressure Pd from the compressor 10 detected by the pressure sensor 27d, is at or below a predetermined value, (for example, 20 kg/cm²G) is judged. When the discharged pressure Pd is at or below the predetermined value, the flow proceeds to Step S200, in which the electromagnetic clutch 11 is switched ON, whereupon the compressor 10 is activated.

On the contrary, when the discharged pressure Pd from the compressor 10 is higher than the predetermined value, the flow proceeds from Step S190 to Step S210, in which the compressor 10 is deactivated by switching OFF the electromagnetic clutch 11 and updating the flag to F=1. The intermittent ON and OFF control of the compressor 10 in Steps S190 through S210 is performed to forestall an abnormal increase in the discharged pressure Pd from the compressor 10 by controlling the upper limit of the discharged pressure Pd from the compressor 10 to stay at or below the aforementioned predetermined value while the hot gas heater cycle H is operating, thereby avoiding adverse effects on the durable life of the compressor 10.

Continuing, when the electromagnetic clutch 11 is switched OFF (flag F=1), a negative judgment (NO) is made in Step S180, and whether a timer count number is at or above a predetermined number (30 in the present example) is judged in Step S220. The timer count number 30 is equivalent to a time duration of approximately 30 seconds. When the timer count number is smaller than 30, the flow proceeds to Step S230, and the timer count number is incremented by one. The electromagnetic clutch 11 stays OFF in the following Step S240.

Then, when the timer count number reaches or exceeds 30, the flow proceeds from Step S220 to Step S250, in which the electromagnetic clutch 11 is switched ON (flag F=0). According to the arrangement described above, once the electromagnetic clutch 11 is switched OFF, the electromagnetic clutch 11 stays OFF until the timer count number reaches the predetermined number (30 in the present example), that is, until approximately 30 seconds have passed since the electromagnetic clutch 11 is switched OFF. This arrangement can prevent the electromagnetic clutch 11 (compressor 10) from being switched ON and OFF at an excessive frequency.

On the other hand, when negative judgments (NO) are made in Steps S120 and S130, auxiliary heating by the electric heater 30 is not necessary, and the electric heater 30 is switched OFF in Step S260. Also, when negative judgments (NO) are made in Steps S150 and S160, auxiliary heating by the hot gas heater cycle H is not necessary, and in Step S270, the refrigerating cycle is switched to the cooling mode by opening the cooling electromagnetic valve 13 and closing the heating electromagnetic valve 21, thereby deactivating the hot gas heater cycle H. Then, the electromagnetic clutch 11 is switched OFF in Step S240.

Next, is a description of the operational advantages of the present embodiment. A first advantage occurs when the outside air temperature is in the extremely cold region at or below the second predetermined value (for example, −10° C.) and the engine water temperature is at or below the second predetermined value (for example, 60° C.). The electric heater 30 is switched ON as soon as the hot gas heater cycle H is activated. Hence, both the hot gas heater cycle H and the electric heater 30 perform the auxiliary heating operation with respect to the hot water heat exchanger 24 performing the main heating operation, and raise a temperature of air blown into the passenger compartment, thereby making it possible to enhance the passenger compartment heating ability in extremely cold areas.

A second advantage occurs when the outside air temperature becomes higher than the second predetermined value or the engine water temperature becomes higher than the second predetermined value. In this situation, the hot gas heater cycle H is deactivated, so that only the electric heater 30 is permitted to operate. Then, when the outside air temperature becomes higher than the first predetermined temperature (for example, 10° C.) or the engine water temperature becomes higher than the first predetermined value (for example, 80° C.), the electric heater 30 is deactivated, so that air blown into the passenger compartment is solely heated by a heating operation of the hot water heat exchanger 24.

As has been described, the simultaneous operating state of the hot gas heater cycle H and the electric heater 30, the independent operating state of the electric heater 30, and the simultaneous deactivated state of the hot gas heater cycle H and the electric heater 30 are switched sequentially in response to a change in the outside air temperature or the engine water temperature. Hence, different from a case where both the hot gas heater cycle H and the electric heater 30 are activated or deactivated simultaneously, it is possible to control a change in temperature of air blown into the passenger compartment when the operations are switched. Consequently, it is possible to reduce a change in temperature the driver may feel in association with the switching of the operations of the auxiliary heating means, so that the driver may maintain a comfortable feeling of warmness in a satisfactory manner.

A third advantage is as follows. The hot gas heater cycle H is activated in an extremely cold location when the outside air temperature is at or below the second predetermined value (for example, −10° C.), and the hot gas heater cycle H is deactivated when the outside air temperature becomes higher than the second predetermined value. Consequently, it is possible to control the occurrence of fogging on the windows of a vehicle associated with an operation of the hot gas heater cycle H.

To be more specific, during wintertime heating, the outside air mode is set to the inside/outside air intake mode in order to prevent unwanted fogging on the windows of a vehicle, and for this reason, outside air is introduced into the air conditioning case 22 and passes through the evaporator 18. However, because the outside air is at an extremely low temperature of −10° C. or below while the hot gas heater cycle H is operating, the outside air can be heated to near 0° C. or slightly higher than 0° C. at most even when it is heated in the evaporator 18. Taking this into account, the cooling mode is set during the operation of the previous refrigerating cycle, so that, even when condensed water adheres to the surface of the evaporator 18, re-evaporation of the condensed water due to the operation of the hot gas heater cycle H can be controlled. Consequently, it is possible to control the occurrence of fogging on the windows of a vehicle associated with the operation of the hot gas heater cycle H.

Other Embodiments

The present invention is not limited only to the embodiment described above, but can be altered to the various manners as described below.

(1) According to the embodiment above, the outside air temperature is used as information for judging a heating load, and activation (ON) and deactivation (OFF) of the electric heater 30 are determined by judging whether the outside air temperature is lower than the first predetermined value (for example, 10° C.) in Step S120. However, the inside air temperature may be used instead of the outside air temperature in Step S120, so that activation (ON) and deactivation (OFF) of the electric heater 30 are determined by judging whether the inside air temperature is lower than a predetermined value (for example, 5° C.).

(2) Also, a temperature of the evaporator's blown air may be used in Step S120 instead of the outside air temperature or the inside air temperature, so that activation (ON) and deactivation (OFF) of the electric heater 30 are determined by judging whether the temperature of evaporator blown air is lower than a predetermined value (for example, 0° C.).

(3) Likewise, the inside air temperature or the temperature of evaporator blown air may be used instead of the outside air temperature to control the operation of the hot gas heater cycle H in determining activation and deactivation of the hot gas heater cycle H.

(4) According to the embodiment above, the electric heater 30 is switched ON and OFF simply in response to a change in the heating load (outside temperature). However, a heat value of the electric heater 30 may be changed step by step so as to increase as the heating load becomes larger.

(5) According to the embodiment above, the hot gas heater cycle H is combined with the electric heater 30 as another auxiliary heating means (heat enhancing means). However, the other auxiliary heating means may be a combustion heater instead of the electric heater 30. Alternatively, the other auxiliary heating means may be a viscous heater. The viscous heater converts rotational energy (mechanical energy) into heat energy by rotating a rotor within a viscous fluid, and is known as an auxiliary heating means in an air conditioning system for a vehicle and is disclosed in Japanese Patent Laid-Open Publication No. Hei. 2-246823.

(6) Further, an inside and outside air double-layer unit may be combined with the hot gas heater cycle (heat enhancing means) H instead of the electric heater 30. The inside and outside air double-layer unit is known as being disclosed in Japanese Patent Laid-Open No. 255341/1994, and it is arranged in such a manner that an air channel inside the air conditioning case 22 is partitioned from an air channel at the defroster outlet 31 side and an air channel at the foot outlet 33 side, and that the blower 23 blows outside air through the air channel at the defroster outlet 31 side and inside air through the air channel at the foot outlet 33 side with the air channels being partitioned from each other. Consequently, by setting the inside and outside air double-layer mode in the aforementioned operating region of the electric heater 30 instead of switching ON the electric heater 30, not only can the ability of preventing fogging on the windows of a vehicle be ensured, but also air at a high temperature can be blown out from the foot outlet 33 by re-circulating inside air, thereby making it possible to enhance the passenger compartment heating ability.

(7) According to the embodiment above, the hot gas heater cycle (heat enhancing means) H is combined with the electric heater 30 as another auxiliary heating means (heat enhancing means). However, the hot gas heater cycle (heat enhancing means) H may be combined with, as additional auxiliary heating means (heat enhancing means), two or more components selected from the electric heater 30, a combustion heater, a viscous heater, an inside and outside air double-layer unit, etc.

(8) According to the embodiment above, during the cooling mode, the cooling refrigerating cycle C is designed in such a manner that the liquid refrigerant obtained by gas-liquid separation in the liquid receiver 15 is depressurized by the thermostatic expansion valve 16, so that the thermostatic expansion valve 16 adjusts a degree of overheat of the outlet refrigerant in the evaporator 18. However, the cooling refrigerating cycle C may be formed as a so-called accumulator cycle that does not adjust a degree of overheat of the outlet refrigerant in the evaporator 18 by omitting the liquid receiver 15 and using a stationary throttle as the cooling pressure-reducing means.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air conditioning system for a vehicle (8), comprising:
    a hot gas heater cycle (H) for heating air blown into a passenger compartment by directly introducing a discharged gas refrigerant from a compressor (10) in a refrigerating cycle (C) into an interior heat exchanger (24); and
    a plurality of heat enhancing means including the hot gas heater cycle (H) as a heat enhancing means for enhancing a vehicle (8) passenger compartment heating ability, wherein
    when a heating load is large, the plurality of heat enhancing means are activated, and
    when the heating load is decreased to or below a first predetermined value, the hot gas heater cycle (H) is deactivated;
    the hot gas heater cycle is deactivated when the heating load is decreased to or below the predetermined value;
    an electric heater is included as the heat enhancing means other than the hot gas heater cycle; and
    when the heating load is decreased to or below a second predetermined value, the electric heater is deactivated, said first predetermined value being greater than said second predetermined value.

2. The air conditioning system for a vehicle according to claim 1, wherein the heating load is determined based on at least one of an outside air temperature, an inside air temperature, and a blowing air temperature of the interior heat exchanger.

3. The air conditioning system for a vehicle according to claim 1, further comprising a hot water heat exchanger for heating the air blown into the passenger compartment by using hot water as a heat source, wherein the plurality of heat enhancing means form auxiliary heating means with respect to the hot water heat exchanger.

4. The air conditioning system for a vehicle according to claim 3, wherein a temperature of the hot water circulating through the hot water heat exchanger is detected, and operations of the plurality of heat enhancing means are controlled depending on the temperature of the hot water.

5. An air conditioning system for a vehicle, comprising:
    a hot gas heater cycle for heating air blown into a passenger compartment by directly introducing a discharged gas refrigerant from a compressor in a refrigerating cycle into an interior heat exchanger; and
    a plurality of heat enhancing means including the hot gas heater cycle as a heat enhancing means for enhancing a passenger compartment's heating ability, wherein
    operations of the plurality of heat enhancing means are controlled in response to a change in a heating load,
    an electric heater is included as the heat enhancing means other than the hot gas heater cycle; and
    when the plurality of heat enhancing means are deactivated due to a decrease of the heating load, the hot gas heater cycle is deactivated, at a first predetermined value of the heating load and the electric heater is deactivated at a second predetermined value of the heating load, the first predetermined value being greater than the second predetermined value.

6. The air conditioning system for a vehicle according to claim 5, wherein the heating load is determined based on at least one of an outside air temperature, an inside air temperature, and a blowing air temperature of the interior heat exchanger.

7. The air conditioning system for a vehicle according to claim 5, further comprising a hot water heat exchanger for heating the air blown into the passenger compartment by using hot water as a heat source, wherein the plurality of heat enhancing means form auxiliary heating means with respect to the hot water heat exchanger.

8. The air conditioning system for a vehicle according to claim 7, wherein a temperature of the hot water circulating through the hot water heat exchanger is detected, and operations of the plurality of heat enhancing means are controlled depending on the temperature of the hot water.

9. An air conditioning system for a vehicle, comprising:
a hot gas heater cycle for heating air blown into a passenger compartment by directly introducing a discharged gas refrigerant from a compressor in a refrigerating cycle into an interior heat exchanger; and
a plurality of heat enhancing means including the hot gas heater cycle as heat enhancing means for enhancing a passenger compartment's heating ability, wherein
operations of the plurality of heat enhancing means are controlled in response to a change in a heating load,
an electric heater is included as the heat enhancing means other than the hot gas heater cycle; and
when the plurality of heat enhancing means are deactivated due to a decrease of the heating load, the hot gas heater cycle is deactivated at a first predetermined value of the heating load and the electric heater is deactivated at a second predetermined value of the heating load, the first predetermined value being greater than the second predetermined value.

10. The air conditioning system for a vehicle according to claim 9, wherein the heating load is determined based on at least one of an outside air temperature, an inside air temperature, and a blowing air temperature of the interior heat exchanger.

11. The air conditioning system for a vehicle according to claim 9, further comprising a hot water heat exchanger for heating the air blown into the passenger compartment by using hot water as a heat source, wherein the plurality of heat enhancing means form auxiliary heating means with respect to the hot water heat exchanger.

12. The air conditioning system for a vehicle according to claim 11, wherein a temperature of the hot water circulating through the hot water heat exchanger is detected, and operations of the plurality of heat enhancing means are controlled depending on the temperature of the hot water.

13. An air conditioning system for a vehicle comprising:
a casing;
a hot gas heater cycle for heating air blown through the casing into a passenger compartment by directly introducing a discharged gas refrigerant from a compressor in a refrigerating cycle into an interior heat exchanger disposed within said casing;
an electric heater disposed at a downstream air side of the interior heat exchanger, wherein
when a heating load is large, the hot gas heater cycle and the electric heater are activated;
when the heating load is decreased to or below a first predetermined level, the hot gas heater cycle is deactivated; and
when the heating load is decreased to or below a second predetermined level, the electric heater is deactivated.

14. The air conditioning system according to claim 13 wherein said first predetermined value is greater than said second predetermined value.

15. The air conditioning system for a vehicle according to claim 13, wherein the heating load is determined based on at least one of an outside air temperature, an inside air temperature, and a blowing air temperature of the interior heat exchanger.

16. The air conditioning system according to claim 13 further comprising a hot water heat exchanger disposed between said interior heat exchanger disposed between said interior heat exchanger and said electric heater, said hot water heat exchanger for heating the air blown through the casing by using hot water as a source.

17. The air conditioning system according to claim 16 wherein a temperature of the hot water circulating through the hot water heat exchanger is detected, and operation of the hot gas heater cycle and the electric heater are controlled based on the temperature of the hot water.

* * * * *